United States Patent [19]
Wang et al.

[11] Patent Number: 5,379,130
[45] Date of Patent: Jan. 3, 1995

[54] TEXT/IMAGE SEPARATION METHOD

[75] Inventors: Te-Mei Wang, Miao Li; Po-Chih Wang, Taichung; King-Lung Huang, Hsinchu, all of Taiwan, Prov. of China

[73] Assignee: Industrial Technology Research Institute, Hsinchu, Taiwan, Prov. of China

[21] Appl. No.: 984,325

[22] Filed: Dec. 2, 1992

[51] Int. Cl.$^5$ .............................................. H04N 1/40
[52] U.S. Cl. .................................. 358/462; 358/448; 358/456; 382/52
[58] Field of Search ............... 358/455, 456, 457, 458, 358/462, 465, 466, 448; 382/22, 27, 41, 52

[56] References Cited

U.S. PATENT DOCUMENTS

| | | |
|---|---|---|
| 4,411,015 | 10/1983 | Scherl et al. |
| 4,449,150 | 5/1984 | Kato |
| 4,903,143 | 2/1990 | Sakamoto ........................ 358/462 |
| 4,958,238 | 9/1990 | Katayama et al. |
| 4,975,786 | 12/1990 | Katayama et al. |
| 4,996,602 | 2/1991 | Ono et al. ........................ 358/455 |
| 4,996,603 | 2/1991 | Kanemitsu et al. ............... 358/462 |
| 5,034,990 | 7/1991 | Klees |
| 5,073,953 | 12/1991 | Westdijk |

OTHER PUBLICATIONS

"An Adaptive Algorithm for Spatial Grey Scale", Robert Floyd and Louis Steinberg, *SID International Symposium Digest of Technical Papers*, pp. 36–37, 1975.

"Digital Halftoning", Robert Ulichney, published by MIT Press, pp. 10–13, 1987.

"Block Segmentation and Text Extraction in Mixed Text/Image Documents", Friedrich M. Wahl, Kwan Y. Wong, and Richard G. Casey, *Computer Graphics and Image Processing*, vol. 20, pp. 375–390, 1982.

Primary Examiner—Richard Hjerpe
Assistant Examiner—Thomas D. Lee
Attorney, Agent, or Firm—Merchant, Gould, Smith, Edell, Welter & Schmidt

[57] ABSTRACT

A text/image separation method is disclosed which handles the text segment and the image of a document to be printed in a separate and parallel fashion to provide a better printing quality of the document.

10 Claims, 10 Drawing Sheets

TEXT/IMAGE SEPARATION METHOD

FIELD OF THE INVENTION

The present invention relates generally to a gray scale image processing method which converts a gray scale image containing pixels of different gray levels into a binary image containing pixels of either "black" pixel or "white" pixel and in particular to a text/image separation process which comprises an edge enhancement algorithm to enhance the performance of the gray scale processing method on text segment.

BACKGROUND OF THE INVENTION

In modern automatized offices, most of the documents and/or correspondences are transmitted and/or received with facsimile machines. The conventional way that a facsimile machine prints a document can be categorized as follows.

(1) Line-Art Method

This method is basically good for documents containing texts, lines and other symbols only, which are considered bi-leveled images, but it is not able to display the gray levels of images.

(2) Ordered Dither Method

This method can express versatile gray levels. However, texts printed with this method generally contain blurred or coarse edges and moire patterns occurring on the smooth gray area is inevitable during processing documents containing text and images with this method.

(3) Error Diffusion Method

The performance of this method for processing text and image is fallen between the above-mentioned methods. The disadvantages of this method are that noises are present on the white background and the printed image is generally slightly darker than expected. An improved error diffusion method has been proposed to address the background noises and image darkening problems. "IMPROVED ERROR DIFFUSION METHOD" (Chinese Patent Application No. 81108212)

It is very common that the documents to be processed with a facsimile machine may have both text segments and image segments. It is generally up to a user of the facsimile machine to decide with which method a document should be printed. This is, obviously, inconvenient to the user. Further, when a document contains mixed text and image, such as a picture with captions, no matter which method is selected to print the document, quality of a portion of the output will be sacrificed, due to the nature of these prior art methods as described above.

To improve the printing quality, separation of text from image is a remedy for the prior art methods. Theory of text/image separation has been discussed in some academic literatures, such as:

F. M. Wahl, K. Y. Wong and G. R. Casey, "Block Segmentation and Text. Extraction in Mixed Text/Image Documents", Computer Graphics and Image Processing, vol 20, pp. 375-390, 1982.

Also, some patents related to this field have been published, such as U.S. Pat. Nos. 4,411,015, 4,958,238, and 5,073,953.

These methods are generally very complicated in calculation and thus some of them are good only for the recognition of printed text. Further, an optical character recognition system has to be incorporated to perform the separation. U.S. Pat. No. 4,958,238 discloses a method which can be used in facsimile machines. However, since the '238 patent adopts the error diffusion method and uses modified diffusion factors in processing text edges, the processing result thereof has a clear text performance while sacrificing the gray scale of image. This of course is not acceptable for a high quality printing of documents.

It is therefore desirable to provide a simple and effective method to address the afore-mentioned problems and disadvantages.

OBJECTS OF THE INVENTION

The principle object of the present invention is to provide a text/image separation method which sets up a $3 \times 3$ window to detect the existence of text edges or line edges in order to separate text or simple geometrical elements or symbols: from gray scale image to improve the printing quality of documents.

It is another object of the present invention to provide a text/image separation method which comprises an algorithm for automatically adjusting an edge cutting threshold, so that even a very tiny text or a very slim or thin line can be clearly printed without any negative affection on the printing performance of the images.

Other objects and advantages of the invention will be apparent from the following description of the present method, reference being made to the accompanying drawings wherein:

DETAILED DESCRIPTION OF THE PREFERRED EMBODIMENT

The present invention provides a method which addresses the above-mentioned problems by separating text segments from image segments in processing a document. The text and image are handled separately in order to preserve the gray scale characteristic of the image and to provide a clear text printing. And thus a higher quality of printing can be obtained for both text and image.

Figure 1:
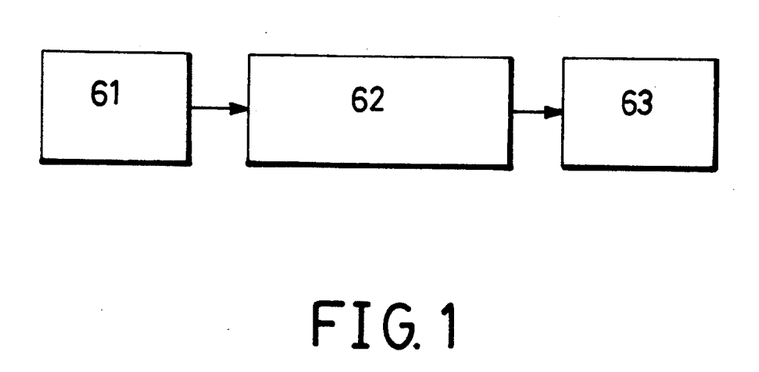
FIG. 1 is a schematic system block diagram of a mono-processing system.

For a mono image processing system, the system block diagram may be as the one shown in FIG. 1. The image is first scanned in and digitized by an input module or scan-in module 61. The digitized data are then processed by a halftone and text/image separation module 62. The result so obtained will then be printed by an output module or printing module 63. The currently commercially-available low cost laser beam facsimile machine usually has a 200 or 300 dpi (dots per inch) resolution. In general, a byte, usually constituted by 8 bits, is used to store the gray level values of a sample pixel and consequently, the gray scale is divided into 256 levels, from the lowest and darkest 0 level to the highest and lightest 255 level.

Since the laser beam printing machines are in general binary apparatus, namely they can only process bi-leveled image data, the input image scanned in by the scan-in module 61, which is generally a gray scale image containing multi-gray level data, should be converted into a bi-leveled output image in order to be printed by the output module 63. The conversion is usually done with a halftone process, an example of which is the above-mentioned ordered dither method or the error diffusion method. By doing so, the dispositions of the black dots and white dots (blanks) can appropriately be arranged in order to provide an acceptable continuously-varied gray tone on the output printing. Meanwhile, separation of text and image is also performed to enhance the output printing of text and simple geometrical lines or elements.

In general, a document contains two types of contents. The first is those having very clear, distinguishable edges, such as texts, lines and symbols and no continuous gray tone is involved. The second is those comprising continuous gray tone image which in general has no distinguishable edges, such as a picture or an image which contains plentiful gray levels.

In this respect, a clear distinguishable edge is a measure for distinguishing the first type content (text) from the second type content (image). The present invention provides a text/image separation method which adopts a 3×3 window to detect the existence of an edge. An edge threshold is selected to check if an edge which is currently covered by the 3×3 window is existing. If an edge is present, then a cutting threshold is calculated to cut apart the portions on the opposite sides of the edge. In the following, a detailed discussion of this separation will be given.

(1) Edge Threshold

To decide if an edge exists, an edge threshold must be set first as a judgement measure. An edge exists between two neighboring pixels if the absolute difference between the gray level values of these pixels is greater than the edge threshold. To determine the edge threshold, a document having a white background with a plurality of intervenient black strips printed at intervals thereon is scanned with a scan-in device. Variations of gray level on transition areas between the white background and the black strips are calculated and a statistic operation is performed with the calculated gray level variations to determine the least value within three standard deviations of the gray level variation distribution. The least value so obtained within the three standard deviations of the distribution is selected as the edge threshold of the present invention.

(2) 3×3 Window Operation

Figure 2:
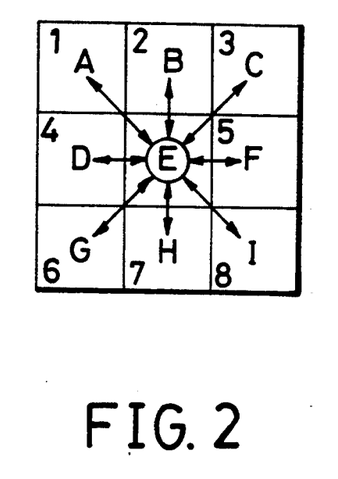
FIG. 2 is a schematic illustration of the $3 \times 3$ windows constructed in accordance with the present method.

With a particular reference to FIG. 2, the 3×3 window is constructed with the currently-processed pixel, pixel E, as the central entity and the eight pixels, pixel A, B, C, D, F, G, H and I surrounding the central pixel E as the neighborhood entities. The absolute differences between the gray level of the central pixel and those of the neighborhood pixels are respectively evaluated. An absolute difference between the gray levels of the central pixel and one of the neighborhood pixels which is greater than the edge threshold indicates that an edge exists between the central pixel and the one of the neighborhood pixels. No edge exists when all absolute gray level differences are less than the edge threshold. Under the situation that no edge is found in association with the currently-processed pixel, the result obtained with the halftone process will be adopted.

(3) Automatic Adjustment of Cutting Threshold

In order to handle characters or lines of small sizes, the present invention provides a variable cutting threshold which is the averaged value of the gray level value of the current pixel and that of one of the eight surrounding pixel in the 3×3 window. In mathematical form, if g is the gray level of the current pixel and $g_i$ represents the gray level of one of the surrounding pixels, then the cutting threshold is calculated as:

$$CUThresh = (g + g_i)/2$$

wherein CUThresh represents the cutting threshold. Comparing the gray level of the current pixel, g, with the cutting threshold, CUThresh, if g is less than CUThresh, then a black dot is printed, otherwise a white dot is printed. Since the cutting threshold is modulated with the: gray levels of the current pixel and the surrounding pixels thereof, small characters and very thin lines can be clearly enhanced.

Figure 3A:
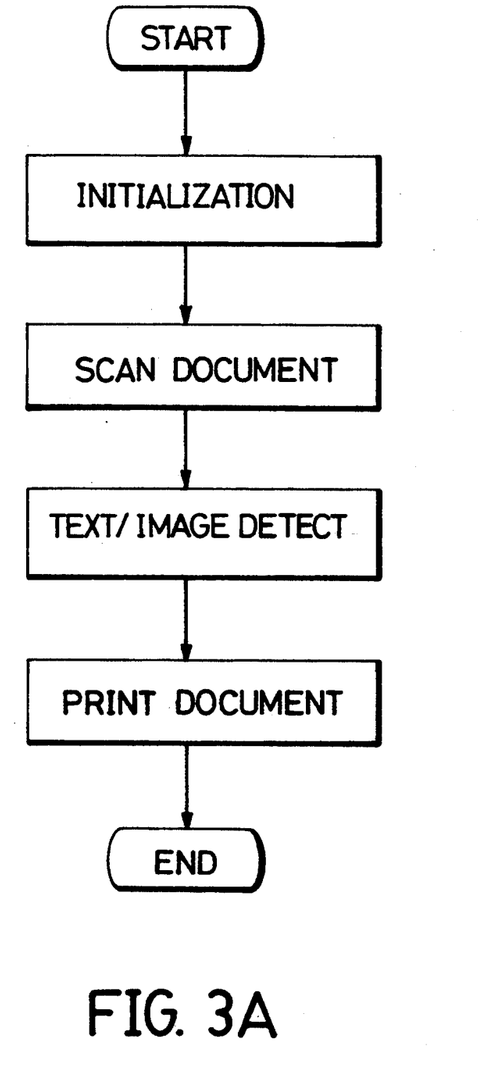
FIGS. 3A, 3B and 3C respectively show the flow charts of the text/image separation method in accordance with the present method.

The system flow chart of the present invention is shown in FIG. 3A. The first step is to initialize the system (INITIALIZATION). And then the document to be processed is scanned in and digitized (SCAN DOCUMENT). The digitized data are processed to have text and image separated (TEXT/IMAGE DETECT). Finally, the completely-processed document is printed out (PRINT DOCUMENT) and then the process cycle ends.

Figure 3B:
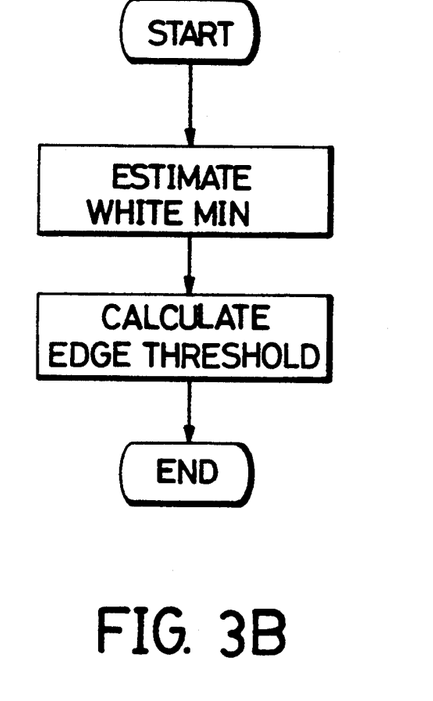

In FIG. 3B, the INITIALIZATION process is shown. The first step, which is ESTIMATE WHITE MIN in FIG. 3B, is to set a white minimum threshold which is a reference for cleaning noises from a white background. This is done by scanning a variety of different kinds of completely white paper to obtain the distribution of the gray levels of the different kinds of paper. A proper value is then selected from this gray level distribution. This value is used to clear away the background noises generated in the process of halftone.

The second step (CALCULATE EDGE THRESHOLD) is to calculate the edge threshold. A piece of white paper with a plurality of spaced black strips thereon is scanned. The variation of gray levels on the transition margins between the white background and the black strips is determined and statistical data related to the gray level variations are calculated. A proper value is selected from the statistic data as the edge threshold. In the present embodiment, the edge threshold is the minimum value within three standard deviations of the statistical distribution of the gray level variations between blacks and whites.

Figure 3C:
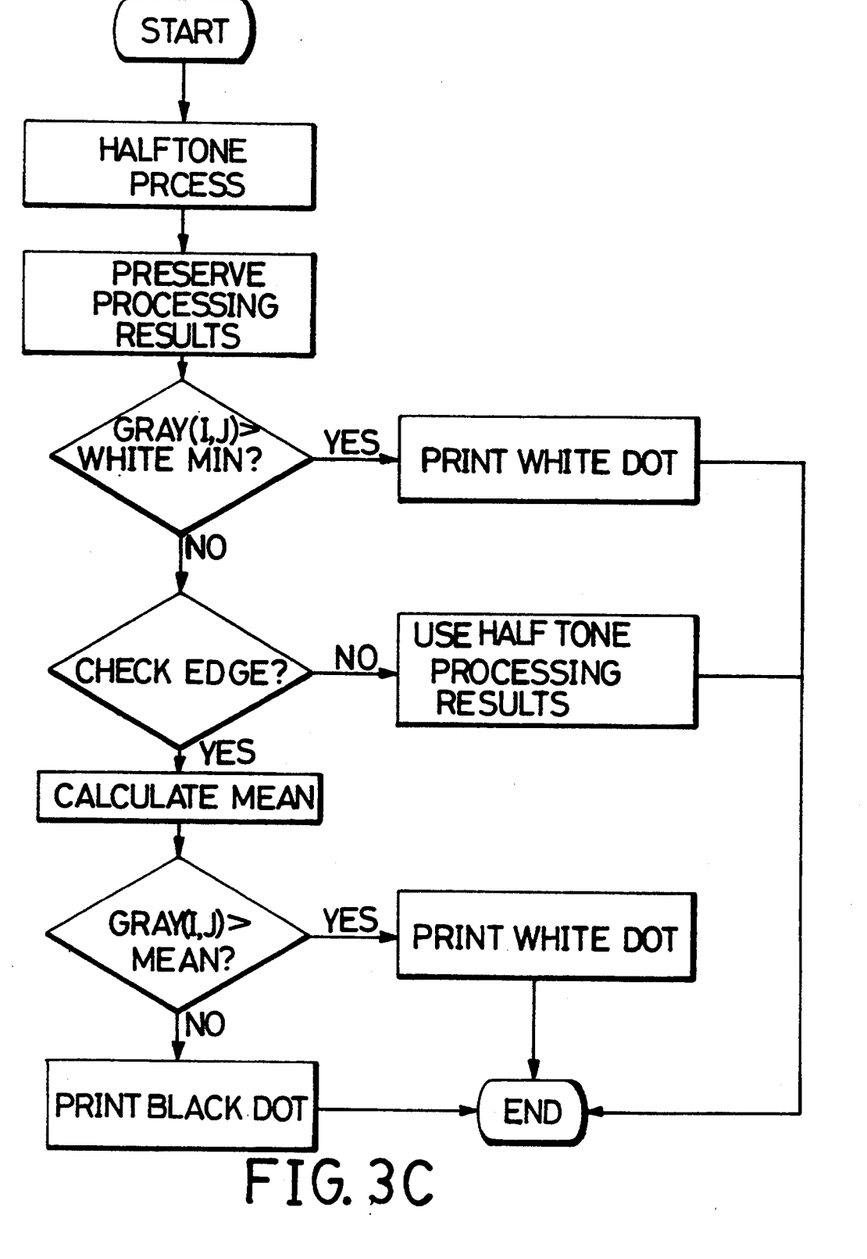

As to the separation of text and image, the flow chart thereof is shown in FIG. 3C. An input image which is constituted by a plurality of pixels is first halftone-processed with either the error diffusion method or the ordered dither method. The result of the halftone-processing is preserved in suitable storage means. It should be noted that since the output image is binary, the image pixels thereof is either in a black dot state or a white dot state. No other output state is possible. In the illustrated flow chart, if the original gray level of an input image pixel is greater than the white minimum threshold, then the associated output pixel is unconditionally a white dot. Otherwise, an edge detection step will be taken. If there is no edge existing, then the result obtained with the halftone method will be taken as the final output. If, on the other hand, an edge exists between the currently-processed pixel and one of the surrounding pixels thereof, then, as discussed previously, a mean value of the gray levels of these two pixels is calculated and compared by the gray level of the currently-processed pixel to determine the output state of the currently-processed pixel. As mentioned previously, if the gray level of the current pixel is larger than the mean gray level value, then the output thereof is a white dot, otherwise a black dot is printed. The process will be repeated until all pixels are processed and the associated output states are obtained.

Figure 4:
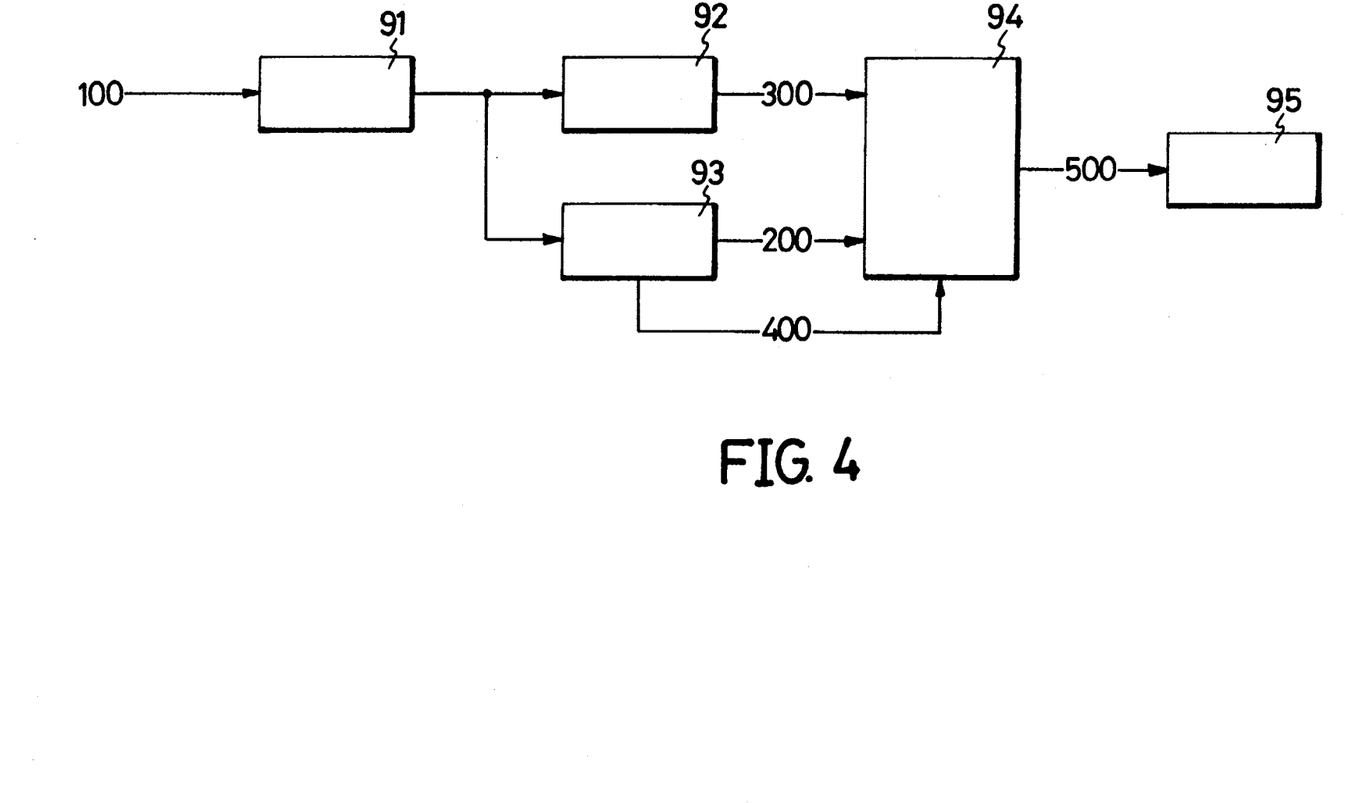
FIG. 4 is a schematic block diagram of the text/image separation system in accordance with the present invention.

A preferred embodiment of the present invention is demonstrated in FIG. 4. An input image 100 which contains a plurality of pixels is read by scan-in means 91 which is preferably a scanner. The image is then processed by a halftone-processing means 92 to initially determine the output states of the image pixels, a first signal 300 being generated thereby to represent the result. The image is simultaneously processed through edge detection means 93 to determine if an edge exists, a second signal 400 being generated to indicate if an edge exists. If there is an edge, then the second signal 400 may have a logic high or "1" output; otherwise it has a logic low or "0" output. The edge detection means 93 also generates a third signal 200 which represents the output state of the currently-processed pixel.

All the signals 200, 300 and 400 are transmitted to selector means 94 which generates an output signal 500 in accordance with the second signal 400. If the second signal 400 is high, which indicates that the currently-processed pixel is on an edge, then the selector means 94 will send the third signal 200 out as the output signal 500 to be printed by binary output means 95 which may be a mono laser beam printer. On the other hand, if the second signal 400 is low, which indicates that the currently-processed pixel is not on an edge, then the first signal 300 obtained from the halftone-processing is allowed to pass through the selector means 94 and transmitted to the binary output means 95 as the output signal 500.

It should be particularly noted that in the present invention, any halftoning algorithm can be adopted without conflicting with the separation process of the present invention. Either the error diffusion method or the ordered dither method or other halftoning method, parallel or sequential in nature, known to those skilled in the art will perform just well with the present invention. Accordingly, no detail of halftoning will be further given herein.

It can be noted from FIG. 4 that in the present invention the halftone-processing and the edge detection are parallel, namely they are conducted simultaneously and each pixel of the input image is processed by both processes. The selector means 94 determines which result from these two processes should be printed. This is of particular importance to the error diffusion method, for the error diffusion method is essentially a sequential process, wherein the result of each step is affected by the error generated previously and the error of the present step will affect the result of the next steps. If the process is externally interrupted or stopped or the intermediate result thereof is forced to change in order to, for example, reduce or change the error accumulation thereof, the smoothness of the final result thereof will generally be sacrificed. The method disclosed in U.S. Pat. No. 4,958,238 possesses such an disadvantage. The present invention provides a parallel-archetecure process which generates text output as clear as the conventional line-art method while maintaining the versatile gray scale of halftoning.

Figure 5:
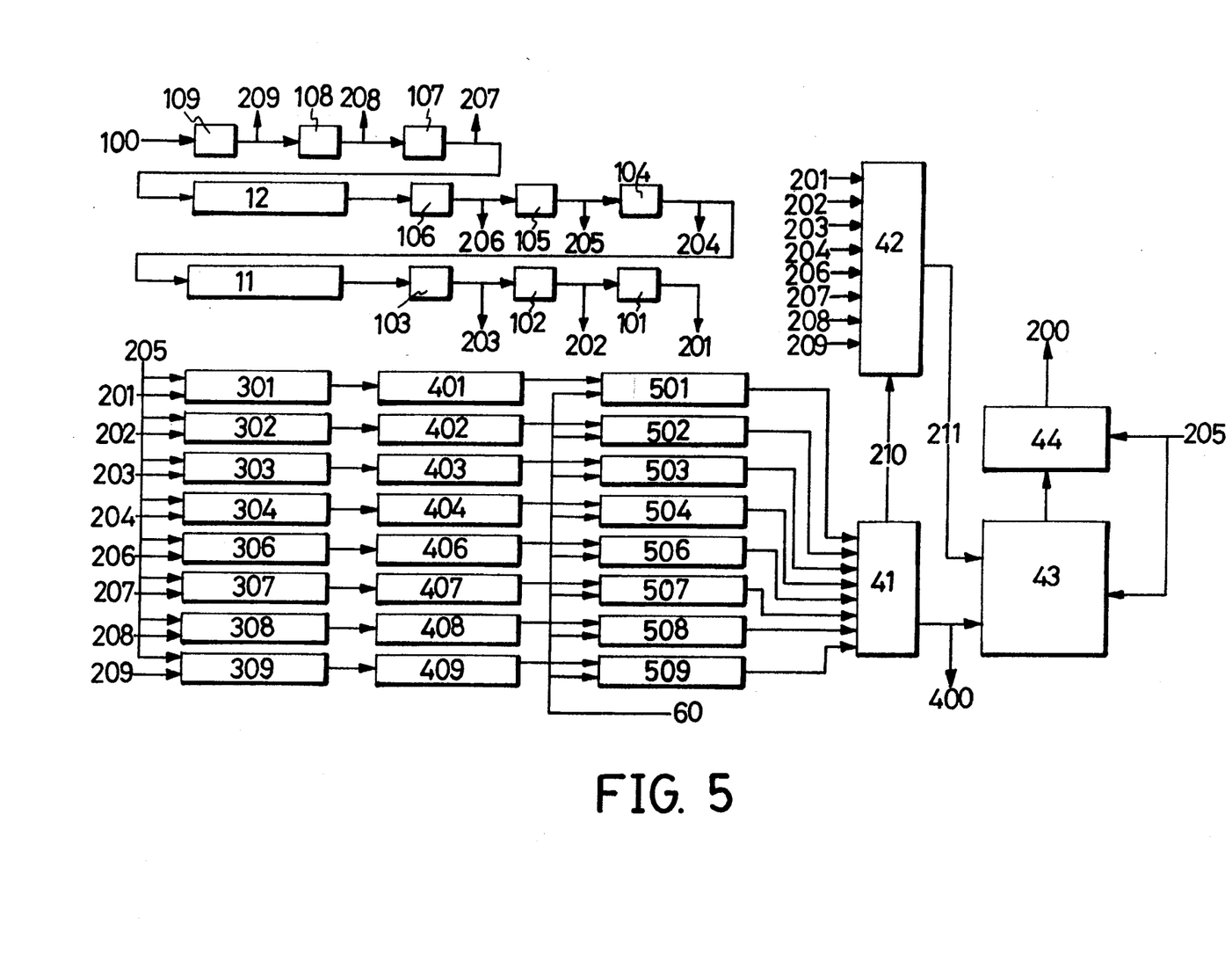
FIG. 5 is a schematic block diagram of the edge detection means adopted in the present invention.

FIG. 5 shows the block diagram of the edge detection means 93. The gray level values of the pixels A, B, C, D, E, F, G, H and I are respectively stored in flip-flops 101, 102, 103, 104, 105, 106, 107, 108 and 109. Two buffers 11 and 12 are respectively connected therebetween for storing the first and the second rows of the 3×3 window. Data signals 201-204 and 206-209 from the flip-flops 101-104 and 106-109, in which the signal 201 is corresponding to pixel A of FIG. 2, the signal 202 to pixel B, the signal 203 to pixel C, the signal 204 to pixel D, the signal 206 to pixel F, the signal 207 to pixel G, the signal 208 to pixel H and the signal 209 to pixel I, are respectively subtracted by the signal 205 from the flip-flop 105 which corresponds to pixel E of FIG. 2. The subtraction operations are respectively performed by subtractor means 301-304 and 306-309. The absolute values of the differences obtained from the subtractor means 301-304 and 306-309 are calculated by means 401-404 and 406-409. The absolute differences are then compared with a pre-set edge threshold 60 in comparator means 501-504 and 506-509. The output of the comparator means 501-504 and 506-509 is sent to an edge detector and priority encoder means 41 which sends out the second signal 400. In case that the second signal 400 is high, which indicates that an edge exits between the currently-processed pixel and one of the surrounding pixels thereof, selector means 42 which is in electrical connection with the edge detector and priority encoder means 41 generates an output 211 of the gray level of the one of the surrounding pixels. If there is more than one surrounding pixels having an edge with the currently-processed pixels, then a priority signal 201 generated by the edge detector and priority encoder means 41 will determine the output priority of these surrounding pixels. In the present embodiment, the output priority is as follows: 201, 202, 203, 204, 206, 207, 208, 209.

The gray level of the selected one of the surrounding pixels 211, together with the gray level of the currently-processed pixel 205, is transmitted to cutting threshold calculation means 43 which calculates and sends to comparator means 44 the cutting threshold. The comparator means 44 compares the gray level of the currently-processed pixel 205 with the cutting threshold to generate the third signal 200.

If on the other hand, the second signal 400 is low, which indicates that no edge exists, then the selector means 42, the cutting threshold calculation means 43 and the comparator 44 are by-passed and the second signal 400 will directly control the selector means 94 of FIG. 4 to print the first signal 300 obtained from the halftone-processing.

Experiments are conducted to show the advantages of the present invention. In these experiments, the tested sample document is IEEE Std 167A-1987 Facsimile test chart. The scan-in device is MICROTEK Scan Maker 600G scanner and the output device is HP Laser Jet IIIp, both having a resolution of 300 dpi.

Figure 6:
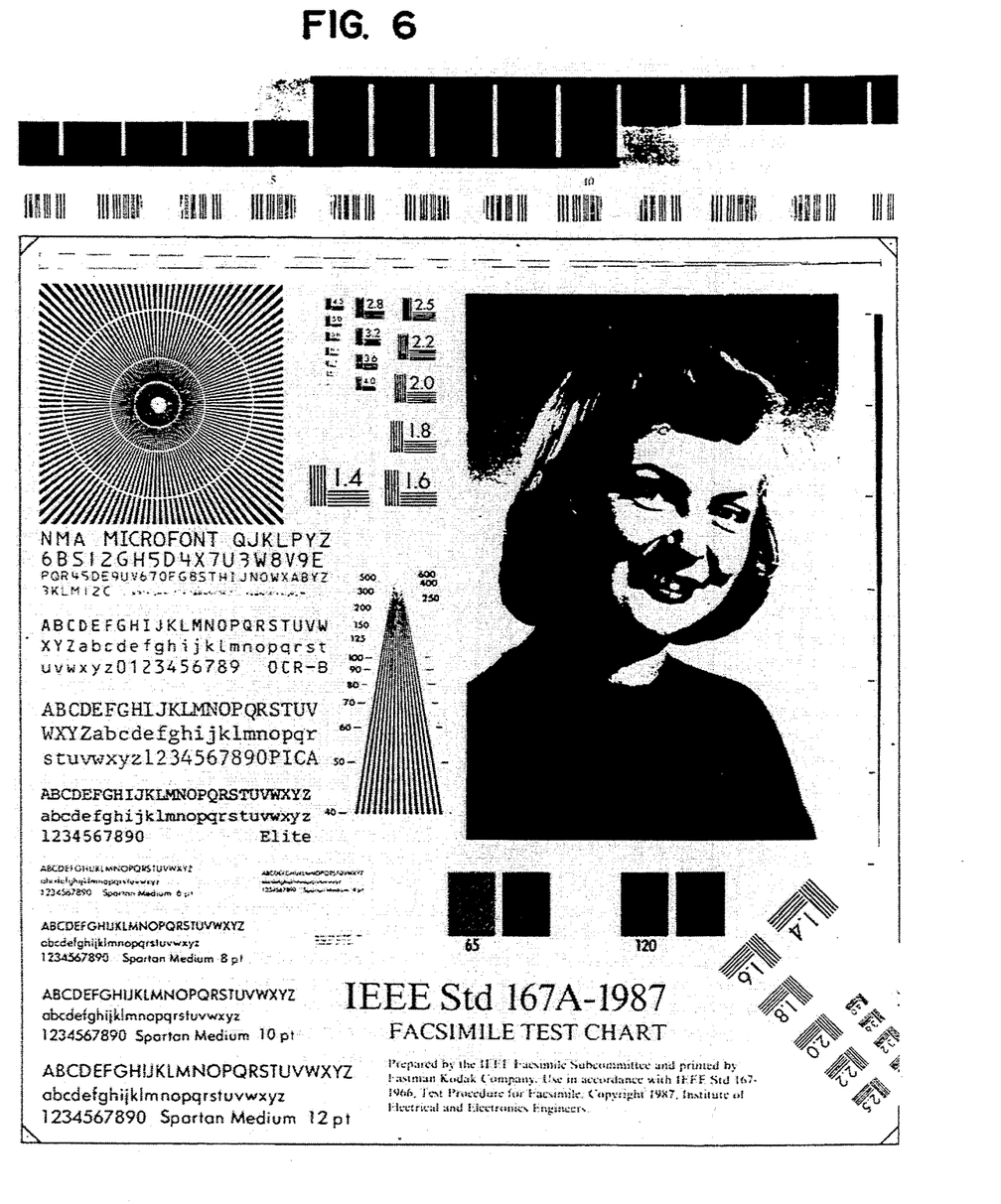
FIG. 6 shows a printout obtained with the conventional line-art method.
Figure 7:
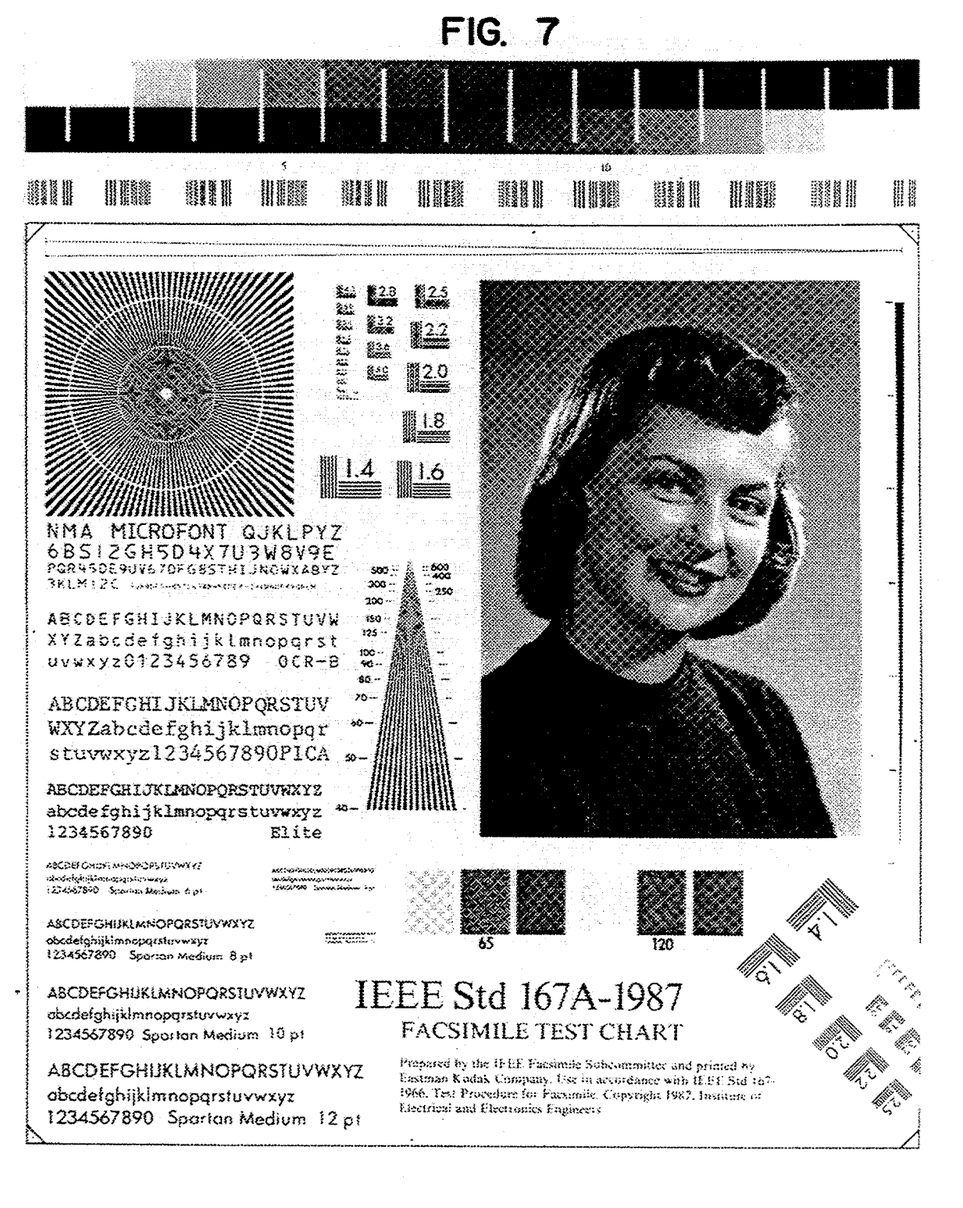
FIG. 7 shows a printout obtained with the conventional ordered dither method.
Figure 8:
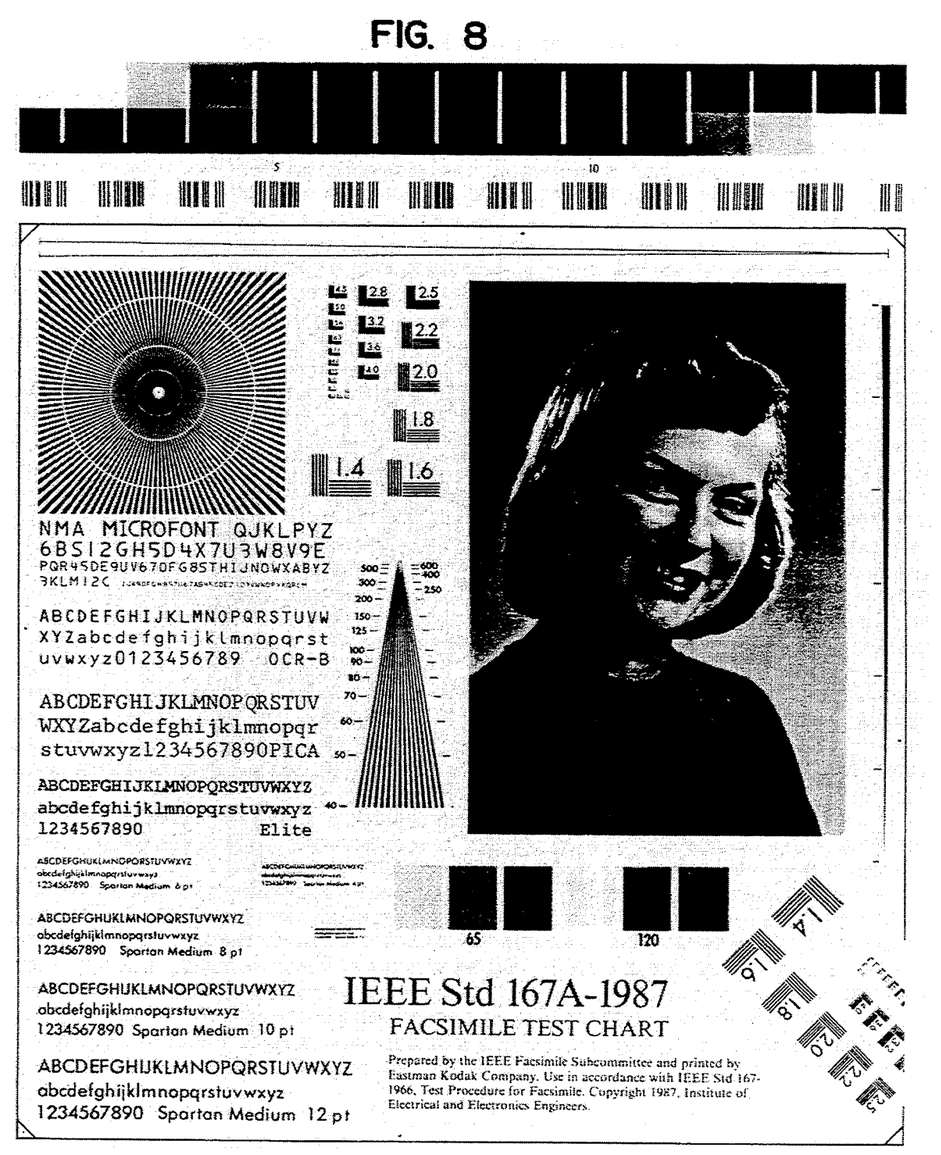
FIG. 8 shows a printout obtained with the conventional error diffusion method.
Figure 9:
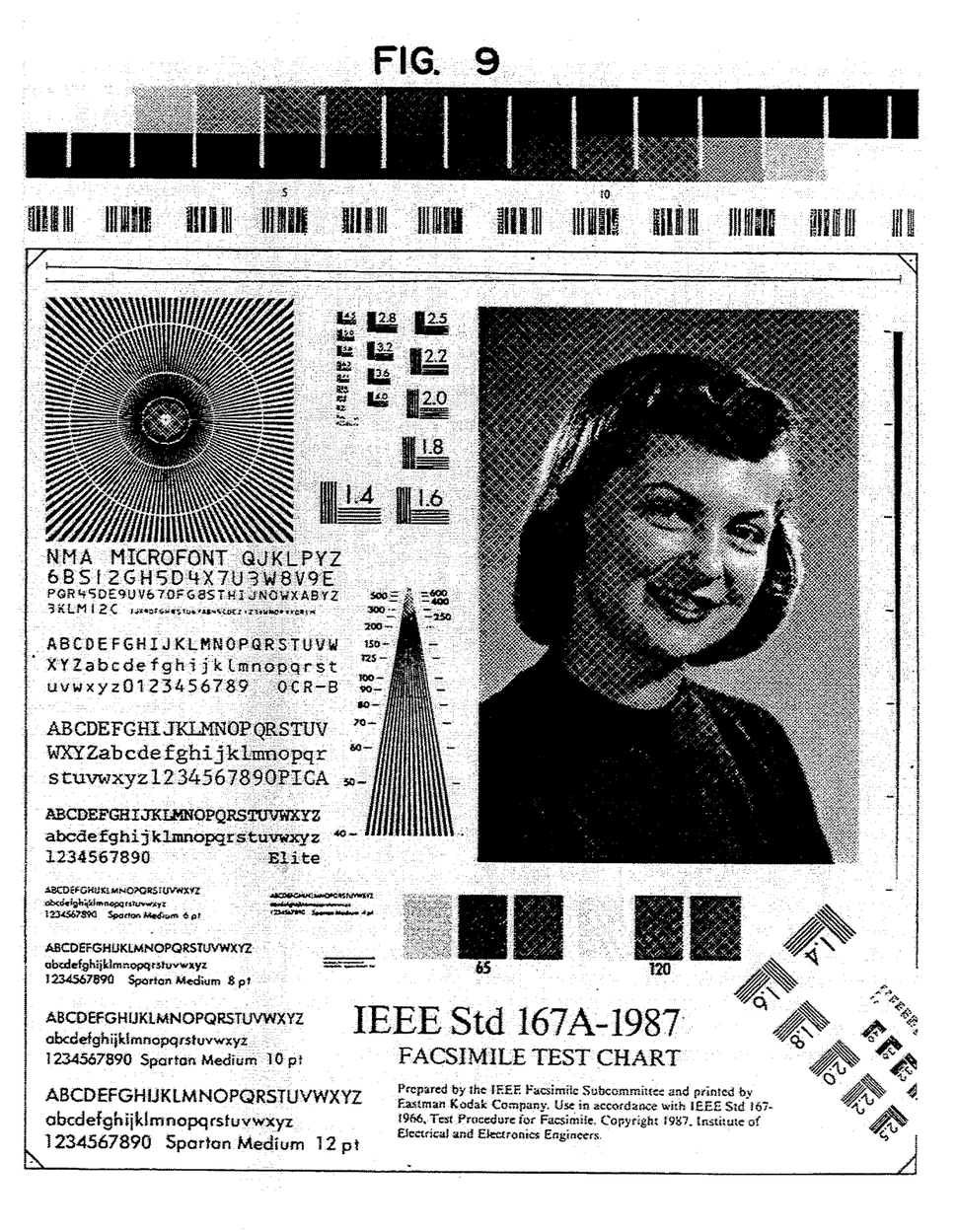
FIG. 9 shows a printout obtained with the present inventive method, in which the image is processed with the ordered dither method.
Figure 10:
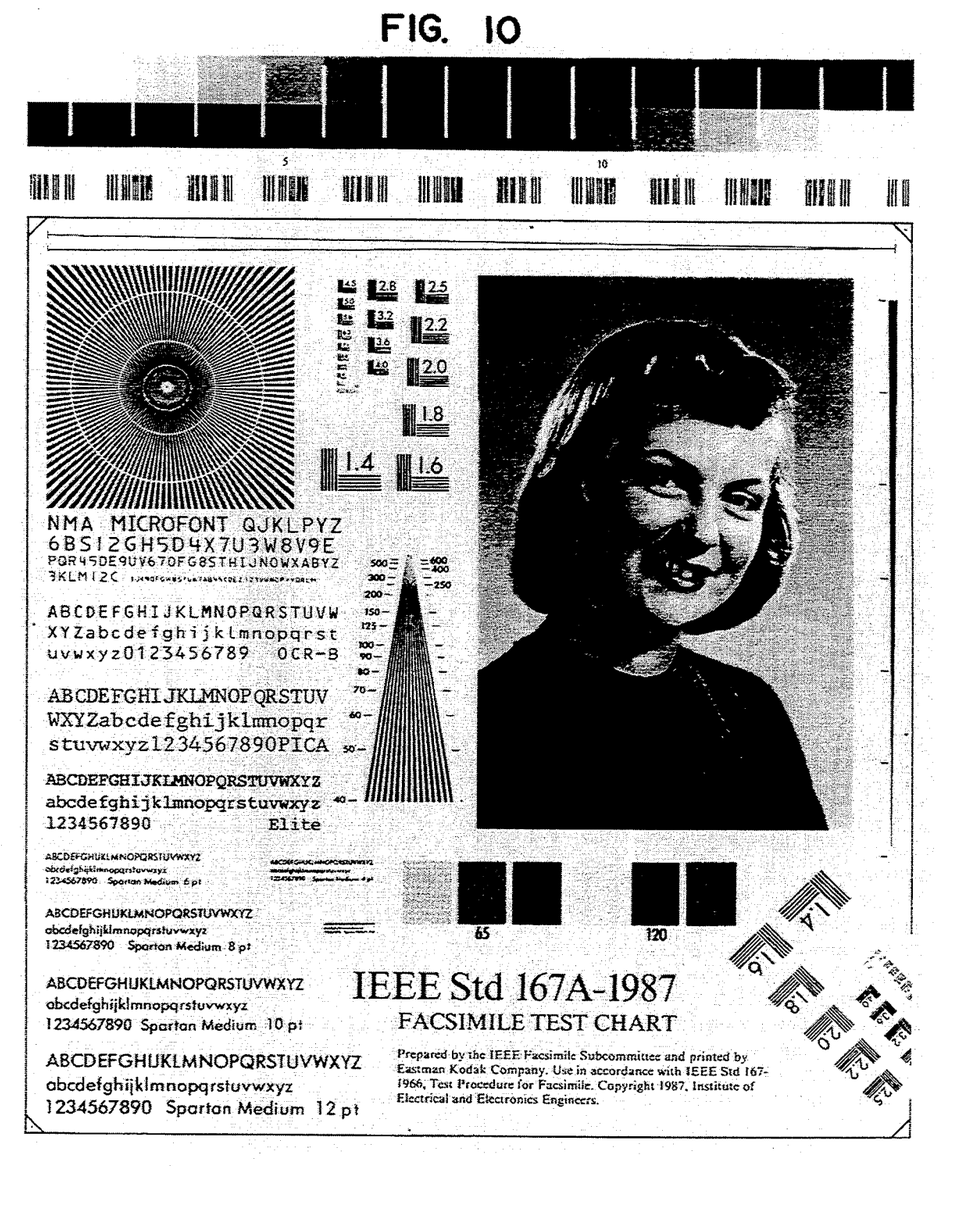
FIG. 10 shows a printout obtained with the present inventive method, in which the image is processed with the improved error diffusion method.

The printouts obtained with the conventional methods, including the line-art method, the ordered dither method and the error diffusion method, are shown in FIGS. 6–8 and those obtained with the present invention are shown in FIGS. 9 and 10. The halftoning algorithm adopted to obtain the graphic segments of the printouts shown in FIGS. 9 and 10 is the ordered dither process (FIG. 9) and the improved error diffusion method (FIG. 10).

In FIG. 6, which is obtained with the line-art method, the text segment is very clear but the image is very poor wherein only two gray levels, black and white, can be displayed.

The result obtained with the ordered dither method is shown in FIG. 7 wherein the gray levels of the image is very vivid while the quality of the text segment is very poor, for example, moire patterns and coarseness of the text edges occur in the printout.

FIG. 8 shows the printout obtained with the error diffusion method in which background noises are clearly observed and the image is slightly too dark to distinguish the details thereof.

FIG. 9 is also obtained with the ordered dither method but with the text/image separation method of the present invention incorporated therein as described herein. A comparison with FIG. 7 shows that the coarse text edge is completely eliminated and the moire patterns are considerably reduced while the quality of the image is preserved.

FIG. 10 is the printout obtained with the improved error diffusion method and the text/image separation method of the present invention. It is seen that the qualities for both the text and the image are significantly improved.

It is concluded that (1) this method is simple and efficient in calculation and is easily to be integrated in a laser beam printing device without any additional cost and a great improvement in the printing quality can be obtained, (2) no optical character recognition system is needed in the present system by using the edge detecting technique so that an on-line real time processing can be obtained, (3) the present system can incorporate any kind of halftoning algorithm, such as the ordered dither method or the error diffusion method, to enhance the gray scale tone of an image, and (4) the present invention provides an excellent enhancement effect for any kind of characters, such as Chinese, English, and lines and symbols.

What is claimed is:

1. A parallel-architecture method for separation of text segment and image segment contained in a document, said method comprising the following steps:
    (1) scanning said document by gray scale scan-in means as an input gray scale image, said input gray scale image comprising a plurality of pixels, each having a gray level belonging to a set of successive gray levels;
    (2) halftone-processing said input gray scale image to convert said gray level pixels into black/white pixels, to create the illusion of gray by means of an appropriate arrangement of black and white dots, and to produce a first signal representing the halftone processing result of a currently-processed gray level pixel;
    (3) constructing a window which covers at least the currently-processed pixel and a plurality of pixels surrounding the currently-processed pixel;
    (4) detecting whether edges exist between the currently-processed pixel and the surrounding pixels by means of reading said gray-level pixels from said gray-scale scan-in means, subtracting in sequence the gray-level of the currently-processed pixel with those of said surrounding pixels to obtain absolute differences thereof, comparing said absolute differences with a pre-determined edge threshold to determine the existence of edges, generating a second signal to indicate the detection, providing a surrounding pixel priority to select one of said surrounding pixels when a plurality of edges exist, calculating a cutting threshold by taking average of the gray levels of the currently-processed pixel and the selected surrounding pixel, and producing a third signal, which represents an output state of the currently-processed pixel, by comparing the gray level of the currently-processed pixel with said cutting threshold;
    (5) selecting said first signal or said third signal in accordance with said second signal; and
    (6) printing out in binary digit said selected signal.

2. The parallel-architecture method as claimed in claim 1, wherein the size of said window is three pixels by three pixels.

3. The parallel-architecture method as claimed in claim 1, wherein an edge is described when the absolute difference of gray level between the currently-processed pixel and one of said surrounding pixels is greater than said edge threshold.

4. The parallel-architecture method as claimed in claim 1, wherein said edge threshold is determined by scanning a piece of white paper with black strips intervening thereon, obtaining the gray level variations on transition areas between said black strips and the white background to establish a statistical distribution thereof, and selecting at least value within three standard deviations of the distribution as said edge threshold.

5. The parallel-architecture method as claimed in claim 1, wherein said surrounding pixel priority is determined according to the sequences from first to eighth: the pixel on top-left position, that on top-middle position, that on top-right position, that on middle-left position, that on middle-right position, that on bottom-left position, that on bottom-middle position and that on bottom-right position of said window.

6. A parallel-architecture system for separation of text segment and image segment contained in a document, said system comprising:
    (1) a gray-scale scan-in means for scanning said document as an input gray scale image, said input gray scale image comprising a plurality of pixels, each having a gray level belonging to a set of successive gray levels;
    (2) a halftone processing means for converting said gray level pixels of said document after scanned by the gray-scale scan-in means into black/white pixels, creating the illusion of gray by means of an appropriate arrangement of black and white dots, and producing a first signal which is represented the halftone processing result of a currently-processed pixel;
    (3) a window which covers at least the currently-processed pixel at a center position therein and a plurality of pixels surrounding said currently-processed pixel;

(4) an edge detection means for reading said gray-level pixels, subtracting in sequence the gray-level of the currently-processed pixel centered in the window with those of said surrounding pixels to obtain the absolute differences thereof, comparing said absolute differences with an edge threshold to decide the existence of edges, generating a second signal to indicate the detection of the edges, providing a surrounding pixel priority to select one of the said surrounding pixels when a plurality of edges exist, calculating a cutting threshold by taking average of the gray levels of the currently-processed pixel and the selected surrounding pixel, and producing a third signal, which represents an output state of the currently-processed pixel, by comparing the gray level of the currently-processed pixel with said cutting threshold;

(5) a selector means for selecting said first signal from said halftone processing means or said third signal from said edge detection means in accordance with said second signal; and (6) a binary print-out means for printing out said selected signal by said selector means.

7. The parallel-architecture system as claimed in claim 6, wherein said window is a 3 pixels by 3 pixels window, and said edge detection means comprises:

(1) a storing means for storing the gray levels of the pixels contained in said window;

(2) a subtractor means for subtracting in sequence the gray level of the currently-processed pixel centered in said window with those of said surrounding pixels, and for calculating the absolute differences so obtained;

(3) an edge threshold comparator means for comparing said absolute differences respectively with a pre-set edge threshold to detect if edges exist between the currently-processed pixel and the surrounding pixels and generating the second signal to indicate the detection of the edges, said edge threshold comparator means further providing a surrounding pixel priority;

(4) a priority selection means for selecting one of the surrounding pixels that have edges existing between them and the currently-processed pixel in accordance with the surrounding pixel priority;

(5) a calculation means for calculating the cutting threshold by taking average of the gray levels of the currently-processed pixel and the selected surrounding pixels; and (6) a comparator means for comparing the gray level of the currently-processed pixel with the cutting threshold to provide the third signal.

8. The parallel-architecture system as claimed in claim 6, wherein said edge threshold is determined by scanning a piece of white paper with black strips intervening thereon, obtaining gray level variations on transition areas between said black strips and the white background to establish a statistical distribution thereof, and selecting a least value within three standard deviations of the distribution as said edge threshold.

9. The parallel-architecture system as claimed in claim 6, wherein said edge detection means decides said edges exist between the currently-processed pixel and the surrounding pixels if the corresponding absolute differences are greater than said edge threshold.

10. The parallel-architecture system as claimed in claim 6, wherein said surrounding pixel priority is determined according to the sequences from first to eighth: the pixel on top-left position, that on top-middle position, that on top-right position, that on middle-left position, that on middle-right position, that on bottom-left position, that on bottom-middle position and that on bottom-right position of said window.

* * * * *